June 12, 1945. M. T. KNUTZEN 2,378,304
CONTROL MEANS FOR POWER OPERATED MACHINERY
Filed May 7, 1943 2 Sheets-Sheet 1

INVENTOR
M. T. KNUTZEN

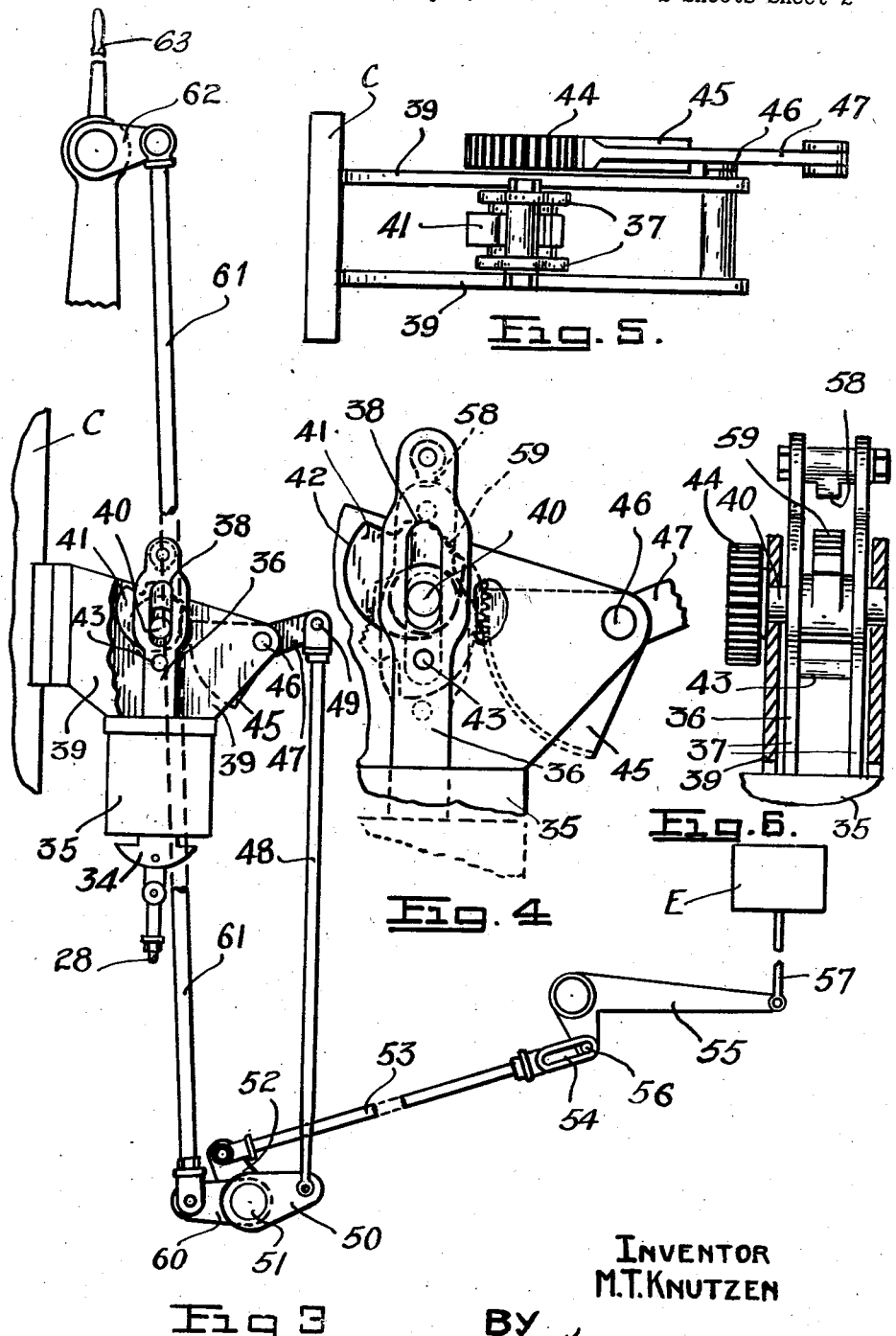

Patented June 12, 1945

2,378,304

UNITED STATES PATENT OFFICE 2,378,304

CONTROL MEANS FOR POWER OPERATED MACHINERY

Max T. Knutzen, Dundas, Ontario, Canada, assignor to The John Bertram & Sons Co. Limited, Dundas, Ontario, Canada, a company of Canada Application May 7, 1943, Serial No. 485,965

10 Claims. (Cl. 188—151)

This invention relates to control means for power operated machinery such as mine hoists.

The invention will be illustrated by reference to its application to mine hoists but it is to be understood that such control means is applicable in other fields.

In power operated hoists for mines it is common practice to operate the brakes therefor by means of fluid pressure, i. e., oil or air, which is applied through a suitable thrust cylinder and under control of a control valve unit feeding the fluid medium to or releasing it from the thrust cylinder, brake application being effected by release of the pressure in the thrust cylinder, the piston of which is actuated by means of weights to apply the brakes on release of the fluid pressure.

It has also been the practice to employ with such mechanism a safety controller such as the well known "Lilly controller" which responds to overspeed, overwind and electric current failure, to deenergize a solenoid operatively associated with the control valve unit which automatically vents the thrust cylinder irrespective of the setting of the normal operating valve of the control unit and thus operates to apply the brakes in the case of any such emergency. It has been usual also to employ with such mechanism a clutch operating mechanism for engaging or disengaging the clutch between the shaft and the drum, such mechanism being so controlled that the clutch may not be disengaged from the drum until the brakes have been operated to fully applied position.

The present invention has to do with control mechanism which may be applied to hoists in the above mentioned manner or to other power operated devices which require control of this nature and whereas it employs the principles of such prior devices, it avoids disadvantages of the latter. In particular, it relates to automatic emergency mechanism that may be manually operated or automatically operated for causing the control mechanism to act instantaneously in any case where such valve might tend to stick or be sluggish, thus accelerating the action of this valve or, in other words, making it positive under such conditions.

It is, therefore, an object of the present invention to provide a simple positive acting mechanism which may be operated manually or automatically to cause positive action of the control valve unit in cases where it might stick or act sluggishly.

A further object of the invention is to provide a simple mechanism of this kind wherein manual or automatic operation may be effected without one interfering or effecting the operation of the other.

With these and other objects in view, the invention generally comprises emergency control means for brake application in hoists and the like employing a brake unit including brake actuating mechanism, a thrust cylinder operatively connected to said mechanism, and a control valve unit controlling said thrust cylinder including emergency means for venting the cylinder to apply the brakes, and means actuated with said emergency means for accelerating its action either manually or by way of automatic control. The invention will be clearly understood by reference to the following detailed specification taken in conjunction with the accompanying drawings.

In the drawings:

Fig. 3 is an enlarged side elevation of the emergency mechanism generally illustrating the connections for manual or automatic operation.

Fig. 4 is a further enlarged fragmentary detail of the accelerating mechanism without the general operating connections.

Fig. 5 is a top plan view of Fig. 4; and

Fig. 6 is a section taken through the supporting means for the accelerating mechanism illustrating the latter in end elevation.

Figure 1:
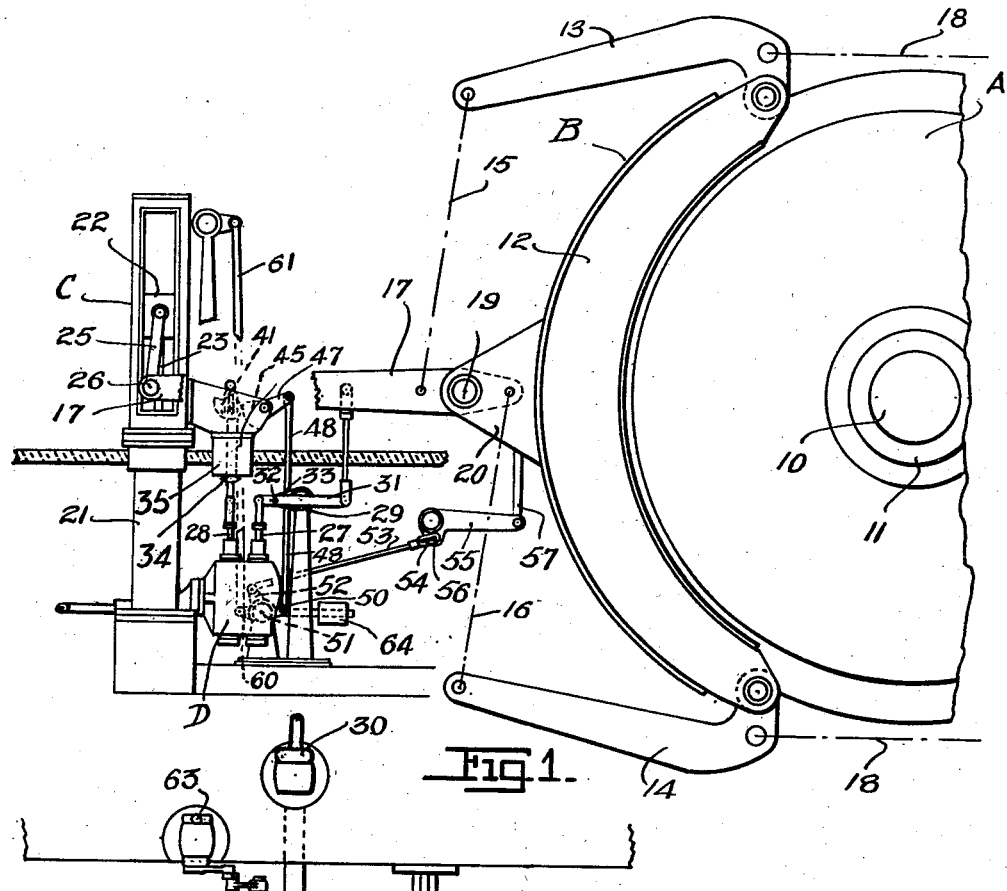
Fig. 1 is a diagrammatic elevation of control mechanism according to the present invention illustrating the general association of a thrust cylinder of control mechanism with the brakes of a hoist for their operation as required, and including illustration of the emergency mechanism according to the present invention.
Figure 2:
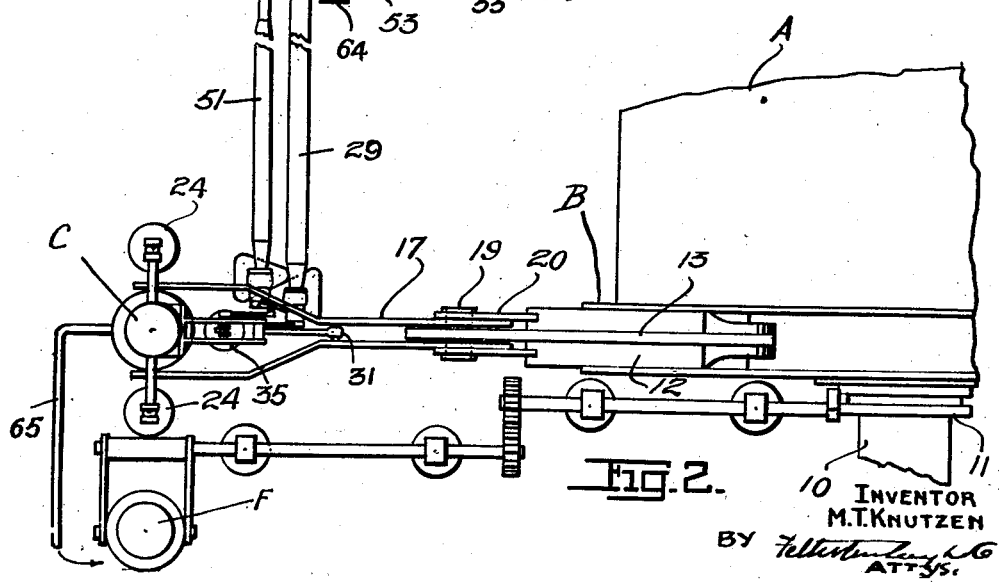
Fig. 2 is a plan view of Fig. 1 illustrating the general position of parts of the mechanism and illustrating in addition the association of a second thrust cylinder with that illustrated in Fig. 1 for the operation of the clutch of the hoist.

Referring to the drawings, and first of all to Figs. 1 and 2, A indicates a hoist drum mounted on a shaft 10 driven from any suitable source of power to rotate the drum. The drum is coupled to the shaft 10 by means of a suitable clutch 11. Associated with the hoist drum is brake mechanism B which includes brakes 12 designed to be disposed on each side of the drum in opposed relation (one side not illustrated) the brakes being operated through the levers 13 and 14 which connect through suitable link structure illustrated by the dotted lines 15 and 16 with the main brake operating lever 17. The levers 13 and 14 are link connected beyond their points of fulcrum with the opposite brake, the link connection being illustrated by the dotted lines 18.

The main brake operating lever is fulcrumed as at 19 on suitable brackets 20 and the links 15 and 16 connect with this main lever on opposite sides of the fulcrum 19 so that if the main brake lever 17 is swung downwardly, the brakes will be applied to the drum from each side with increasing pressure.

The main brake operating lever 17 is controlled by the unit C which comprises a thrust cylinder 21 having a piston therewithin which is raised by fluid pressure which operates the cross head 22 connected with the rod 23 of the piston, the latter being lowered by gravity through weights such as 24 (see Fig. 2) which are connected with the cross head 22. The fluid for raising the piston is passed to the cylinder 21 by means of the fluid control valve unit D, the operation of which will be dealt with in detail hereinafter.

The cross head 22 is connected with the main brake operating lever 17 by means of the link connection 25 which pivotally connects as at 26 with the free end of lever 17. Thus, if the piston within cylinder 21 is lowered by release of fluid pressure thereunder, the main brake operating lever will through the links 15 and 16, levers 13 and 14, and link connections 18 apply the brakes to the drum A. Conversely, when the fluid pressure is again applied beneath the piston and it is raised to position the brake lever 17 in normal position shown in Fig. 1, the brakes will be fully released so that the drum may be rotated.

The operation of the thrust cylinder 21 is controlled through the control valve unit D which includes the valve plungers 27 and 28, the first one controlling the inlet to the valve for the fluid medium and its discharge to the fluid cylinder 21. The second valve plunger is for use in emergencies such as power failure, overspeed or overwind of the hoist, and may vent the cylinder 21 to an outlet through the valve unit so as to permit the piston therein to be lowered through the weights 24, thus to apply the brakes to the hoist or other apparatus that may be involved.

The valve plunger 27 may be manually controlled through the shaft 29 and operating lever 30, connection being made to the valve plunger 27 by means of the link 31 pivotally connected as at 32 to an arm 33 rigidly carried on the shaft 29. Thus, by lowering the plunger 27 through operation of the lever 30, the inlet may be closed and the outlet opened so that the fluid pressure in cylinder 21 is vented. Likewise by returning the lever 30 to normal position, the fluid may again be supplied to cylinder 21 and the outlet from the valve unit D closed.

The plunger 28 is normally held in upright position permitting communication to the cylinder 21 and it is maintained in this upright position through its connection with the core 34 of a solenoid 35. The solenoid is always energized during operation and connected in circuit with automatic control mechanism such as the well known "Lilly controller" which, in responding to overspeed or overwind of the hoist, will cause deenergization of the solenoid, in which case the valve plunger 28 would be released to drop to a lower position closing off the fluid supply and venting cylinder 21 to the discharge outlet of the valve unit D with consequent application of the brakes. To provide against any possibility of sluggish action of the emergency plunger 28 or sticking of this plunger, a special means is provided for accelerating and/or making positive the action of the emergency plunger 28 when it is released by the solenoid 35. In this connection, the core of the solenoid 35 is provided with an upwardly projecting standard 36 formed by two parallel spaced apart strap members 37 longitudinally slotted as at 38. This standard projects between the spaced apart supporting plates 39 which are connected with the unit C to suspend and mount the solenoid. A transverse shaft 40 is journalled between the plates 39 and extends through the slots 38 of the standard 36. On this shaft between the strap members 37 is rigidly secured a cam member 41 designed to be swung about its transverse axis upon rotation of the shaft 40. The cam member 41 normally is in the position as illustrated in the drawings and the cam face 42 is designed to coact with a pin 43 extending across between the two strap members 37.

In this connection if the shaft 40 is rotated in an anti-clockwise direction, the cam face 42 will contact with the pin 43 and by reason of the fact that the shaft 40 is mounted on the stationary supporting plates 39, the standard 36 composed of the spaced apart straps 37 will be forcibly projected downwardly. Rotation of the shaft 40 is effected through a gear 44 keyed on the shaft 40 and disposed on the outside of one of the plates 39. This gear is designed to mesh with a quadrant 45 pivotally mounted as at 46 on one of the plates 39 and is actuated by the integral lever arm 47.

The cam 41 is designed to be actuated through the "Lilly control mechanism" (shown diagrammatically as E, Fig. 3) or manually and this is effected in the following manner. The link 48 is pivotally connected as at 49 to the lever arm 47 and at its opposite end is pivotally connected to an arm 50 which is keyed on a transverse shaft 51. The shaft 51 is placed in connection with the mechanism of the "Lilly control" E by means of an arm 52 keyed on this shaft and extending at an angle to the arm 50. Arm 52 has the link 53 pivotally connected thereto at one end and the other end of this link is slotted as at 54 and connects with the bell crank lever 55 by means of the pin 56. The opposite end of the bell crank lever is pivotally connected to a link 57 which in turn connects with a movable member of the Lilly control mechanism E.

Consequently, under emergency conditions such as overspeed or overwind when the Lilly control mechanism E comes into operation, the link 57 will be pulled upwardly and the bell crank lever 55 turned on its pivot so as to pull upon the link 53, thus rotating shaft 51 and moving the arm 50 downwardly. This in turn through link 48 causes lever 47 to be pulled downwardly, swinging the quadrant 45 to rotate the gear 44. The cam 41, therefore, is rotated and the cam face 42 forced with increasing pressure against pin 43, thus accelerating the downward movement of the plunger 28 through the standard 36. At the top of the standard 36 between its spaced apart strap members 37 is a downwardly projecting stop boss 58. This is disposed just above the graded or stepped surface 59 of the cam 41 and when the standard 36 is moved downwardly through the engagement of the cam face 41 with the pin 43, the stop boss engages the graded or stepped portion of the cam which governs the downward movement of the standard and connected valve plunger 28.

To provide for manual operation of the cam

41 so that an operator may be able to accelerate the downward movement of the plunger 28, the shaft 51 carries an arm 60 which is link connected by the link 61 with the lever arm 62 of a hand lever 63. Consequently by pulling upon the lever 63, the shaft 51 is rotated as in the case of its operation by the Lilly control mechanism E, but due to the fact that the link 53 is provided with the slot 54, the consequent lost motion will permit manual operation of this mechanism through the lever 63 without interfering with the setting of the Lilly control mechanism E. In this way, therefore, by a simple combination of elements, I am able to accelerate the downward movement of the plunger 28 when it is released by the solenoid, which operation is effected either through the Lilly control mechanism or manually. By means of a weighted lever 64 rigidly carried on the shaft 51, the emergency accelerating apparatus is returned to normal position.

In operation let us assume that a condition of emergency has arisen causing emergency mechanism to function and the Lilly control mechanism might be in such adjustment that the rapidity of brake application might not be coincident with requirements. In such a condition the cage or skip of a mine hoist might be travelling beyond its predetermined point. This situation, however, can immediately be met by the operator, by operating the emergency hand lever 63 to accelerate the application of the brake through downward movement of the plunger 28 by the cam 41, pin 43 and standard 36. In this connection the step operation 59 of the cam engaged by the stop boss 58 controls the operation to effect relatively graduated brake application to avoid too rapid application of the brakes and consequent undue stresses.

On the other hand, if the viscosity of the oil in the cylinder 21, due to temperature changes increases, effecting operation of the valve plunger 28 so that the valve opening is not sufficient to provide for as rapid application of the brakes as required, the valve opening can be enlarged at the will of the operator by use of the emergency lever 63 as above explained.

Complete emergency control is therefore provided by the present invention and the addition of auxiliary valving means for emergency control and consequent complication of the system is completely avoided.

It is, of course, absolutely essential that the clutch should not be disengaged from the drum at any time unless the brakes are in fully applied position. In this connection, the clutch is operable by unit F connected by fluid pipe 65 with the unit C so that unit F may not operate until unit C has effected a predetermined operation or, in other words, the application of the brakes to full on position. This forms the subject matter of a copending application Serial No. 485,964 filed May 7, 1943, now Patent 2,353,246, July 11, 1944. The clutch is connected by suitable mechanism with the unit F so that it may be operated when the unit F comes into function.

By provision of the simple mechanism described, positive control of the brake mechanism is always available either through the automatic control mechanism (Lilly control) or at the hand of the operator through simple positively acting type of mechanism which will remain inactive except when an emergency arises and which assures that the emergency valve plunger 28 will be positively actuated under all circumstances.

What I claim as my invention is:

1. Control means for brake application in hoists and the like comprising a brake unit including brake actuating mechanism, a thrust cylinder operatively connected to said mechanism and a control valve unit controlling said thrust cylinder including emergency means for venting the cylinder to apply said brakes means connected with said emergency means for positively accelerating the action of the latter and means for independently returning said accelerating means to normal position following operations.

2. Control means for brake application in hoists and the like comprising a brake unit including brake actuating mechanism, a thrust cylinder operatively connected to said mechanism and a control valve unit controlling said thrust cylinder including emergency means for venting the cylinder to apply said brakes, automatic control mechanism for actuating the emergency means means in connection with said automatic control mechanism for positively accelerating the action of said emergency means and means for independently returning said accelerating means to normal position following operations.

3. Control means for brake application in hoists and the like comprising a brake unit including brake actuating mechanism, a thrust cylinder operatively connected to said mechanism and a control valve unit controlling said thrust cylinder including a gravity operated emergency plunger for venting the cylinder to apply said brakes, and means for accelerating the gravity operation of said plunger when said emergency means is caused to function.

4. Control means for brake application in hoists and the like comprising a brake unit including brake actuating mechanism, a thrust cylinder operatively connected to said mechanism and a control valve unit controlling said thrust cylinder including a valve for venting the cylinder to apply said brakes, means normally maintaining said valve in a position to maintain pressure within said cylinder, means operable at a predetermined time for actuating said valve to vent the cylinder whereby to apply said brakes means operatively connected with said valve for positively accelerating the action of the latter and means for independently returning said accelerating means to normal position following operations.

5. Control means for brake application for hoists and the like as claimed in claim 4 in which the valve is connected with rod means projecting from the valve casing, said accelerating means including a cam and means for rotating said cam to engage said rod means under pressure.

6. Control means for brake application in hoists and the like comprising a brake unit including brake actuating mechanism, a thrust cylinder operatively connected to said mechanism, and a control valve unit controlling said thrust cylinder, including a valve for venting the cylinder to apply said brakes, said valve including a valve plunger projecting from said unit, cam means operatively engaged with said plunger, automatic control mechanism for actuating said valve and means connecting said automatic control means with said cam for accelerating the action of said valve upon operation of said automatic control mechanism.

7. Control means for brake application in hoists and the like comprising a brake unit including brake actuating mechanism, a thrust cylinder operatively connected to said mechanism and a control valve unit controlling said thrust cylinder including a valve normally positioned to place said thrust cylinder under fluid pressure, said valve being operable to vent said cylinder to apply said brakes, a solenoid normally energized to maintain said valve in fluid pressure supplying position, automatic control mechanism for actuating said valve, said automatic mechanism being in circuit with said solenoid, said automatic mechanism deenergizing the solenoid under predetermined conditions to release said valve and means operatively connected between said automatic mechanism and said valve for accelerating the action of the latter upon deenergization of said solenoid.

8. Control means for brake application in hoists and the like as claimed in claim 7, in which manually operable means is provided for accelerating the operation of said valve and independently of the operation of said automatic control mechanism.

9. Control means for brake application in hoists and the like as claimed in claim 7, in which the means for accelerating the operation of said valve includes a cam operatively connected with said valve, means for rotating said cam and link means extending between the operating means and said automatic mechanism for operating the cam upon operation of said automatic mechanism.

10. Control means for brake application in hoists and the like as claimed in claim 7, in which the means for accelerating the operation of said valve includes a cam operatively connected with said valve, means for rotating said cam and link means extending between the operating means and said automatic mechanism for operating the cam upon operation of said automatic mechanism, said link means including a lost motion connection and manually operable means for accelerating the operation of said valve, said lost motion connection causing manual acceleration of said valve independently of said automatic control mechanism.

MAX T. KNUTZEN.